Figure 24:
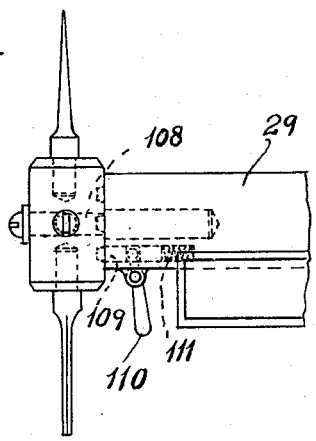

Nov. 1, 1927.
M. V. PRESTON
1,647,415
METHOD OF AND APPARATUS FOR MAKING CUTTING DIES
Original Filed Oct. 11, 1919    9 Sheets-Sheet 1
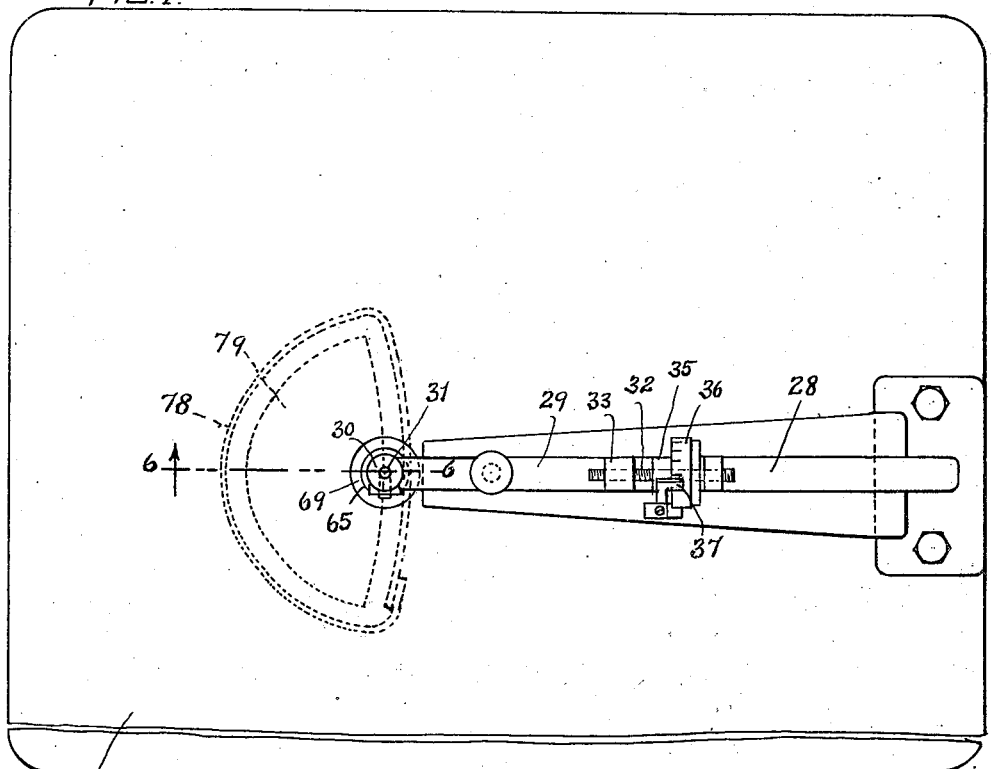
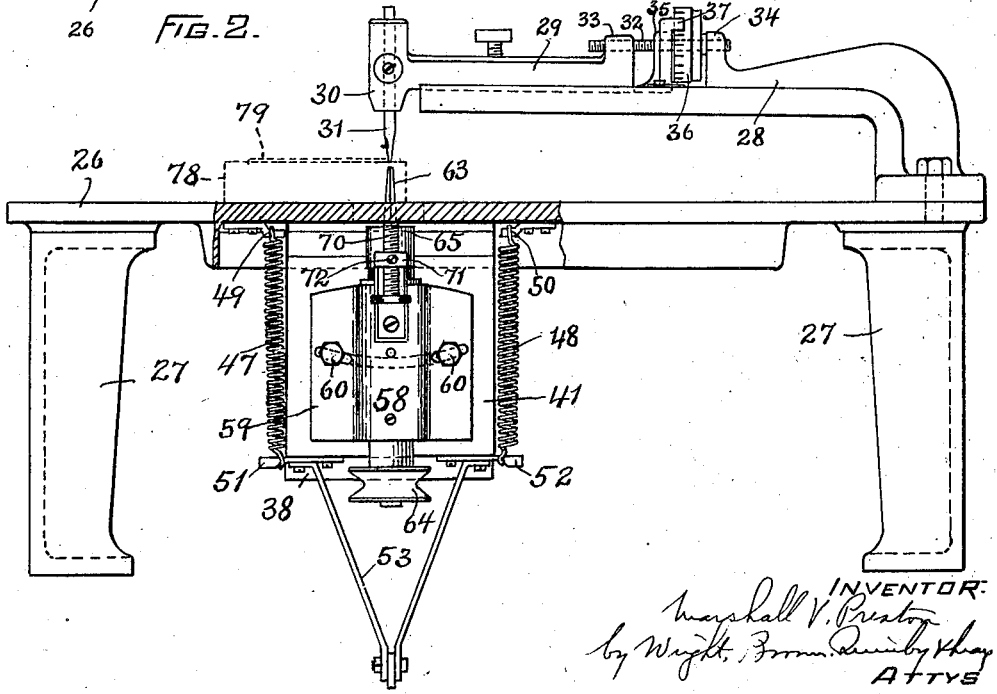

Nov. 1, 1927.
M. V. PRESTON
1,647,415
METHOD OF AND APPARATUS FOR MAKING CUTTING DIES
Original Filed Oct. 11, 1919   9 Sheets-Sheet 2
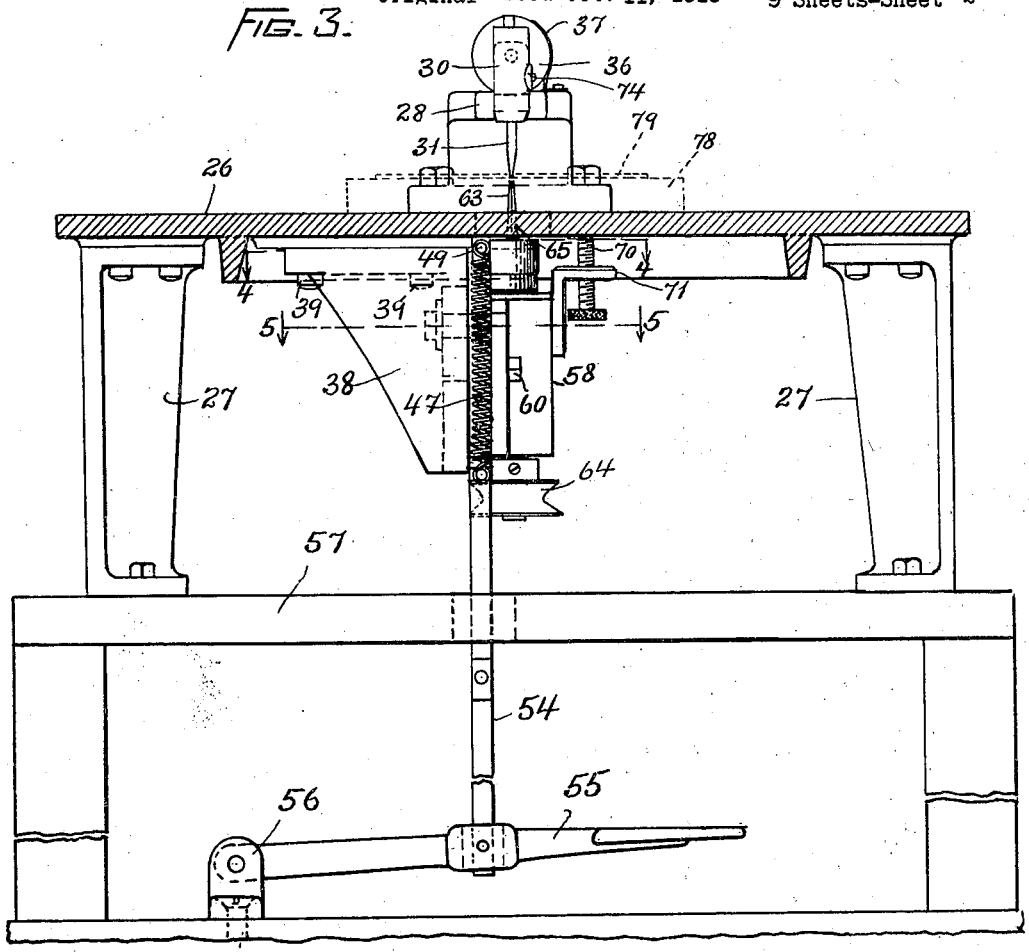
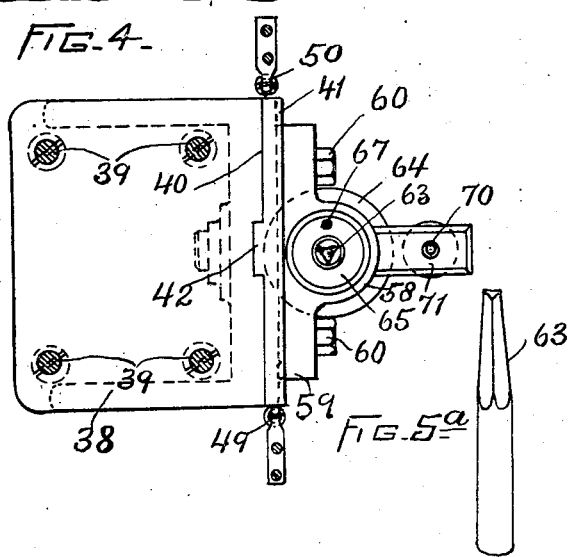
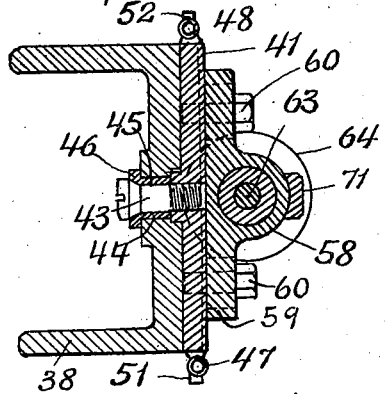

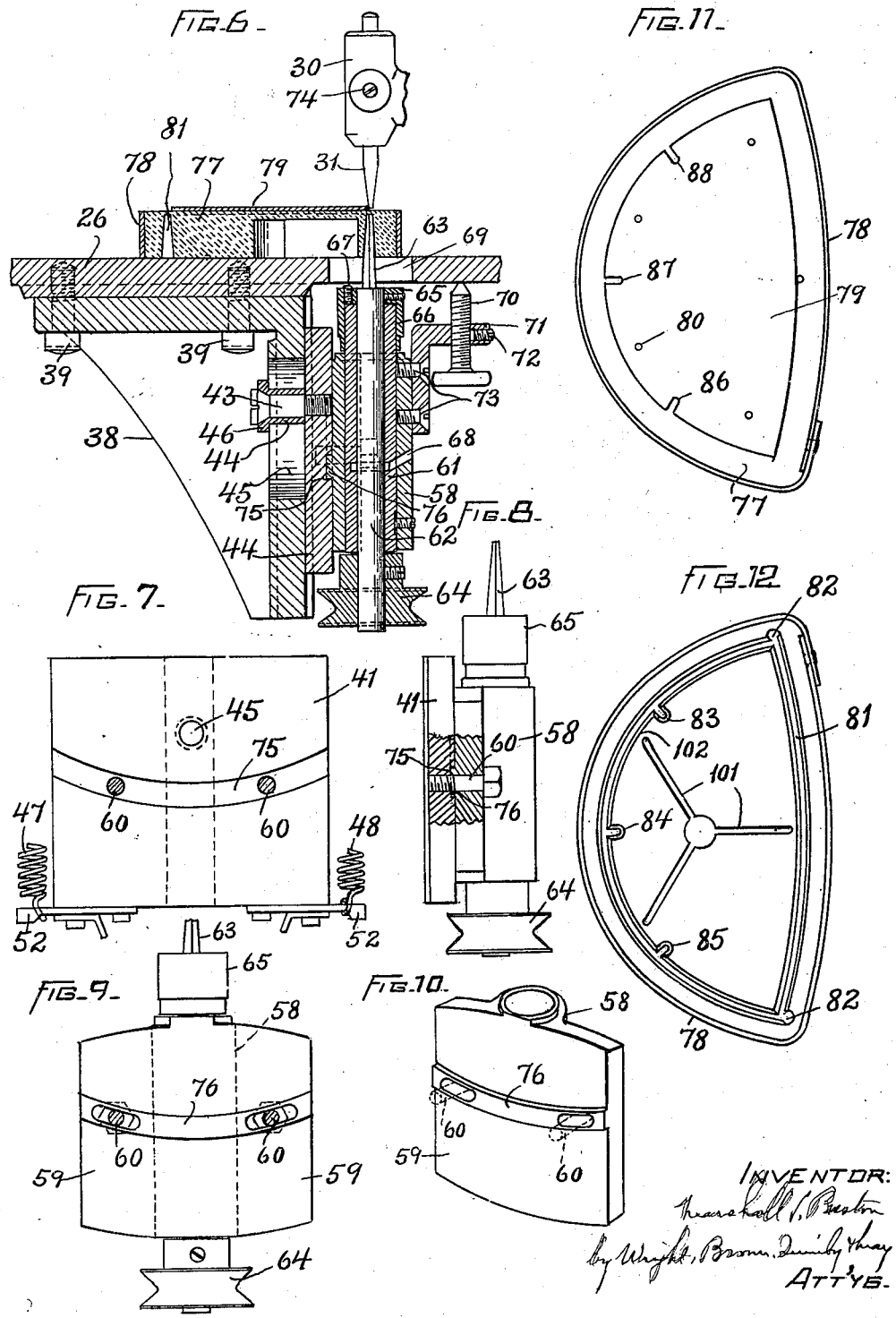

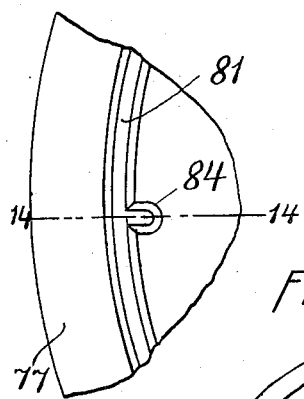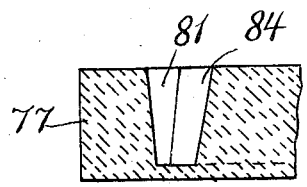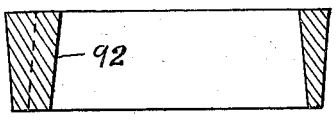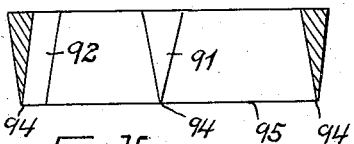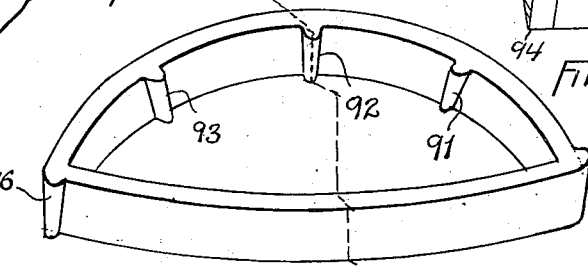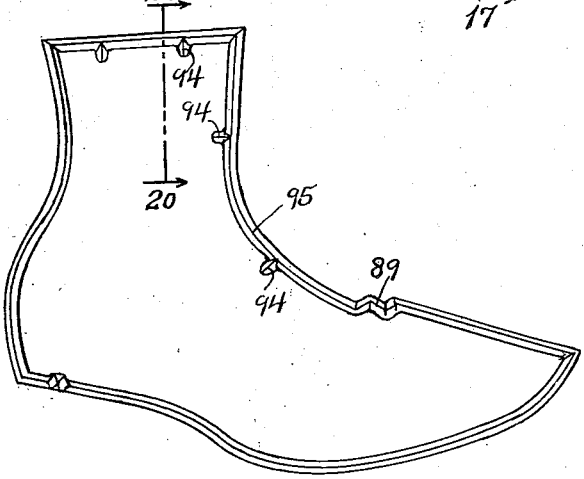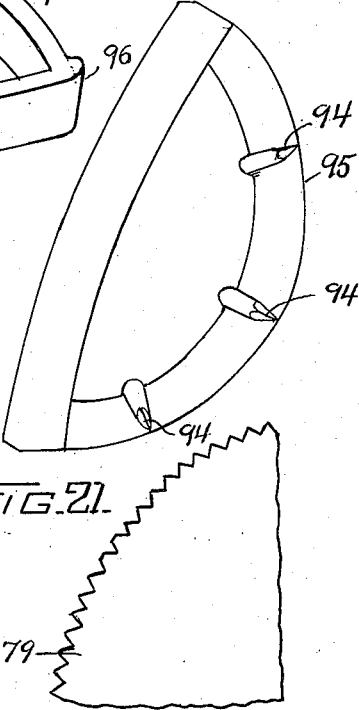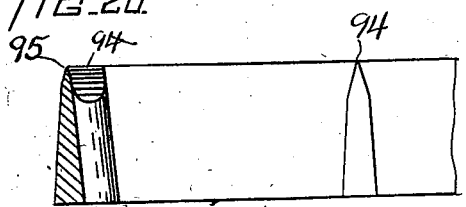

Nov. 1, 1927.

M. V. PRESTON 1,647,415

METHOD OF AND APPARATUS FOR MAKING CUTTING DIES

Original Filed Oct. 11, 1919   9 Sheets-Sheet 5

INVENTOR:
Marshall V. Preston
by Wright, Brown, Quinby & Hay
ATT'YS.

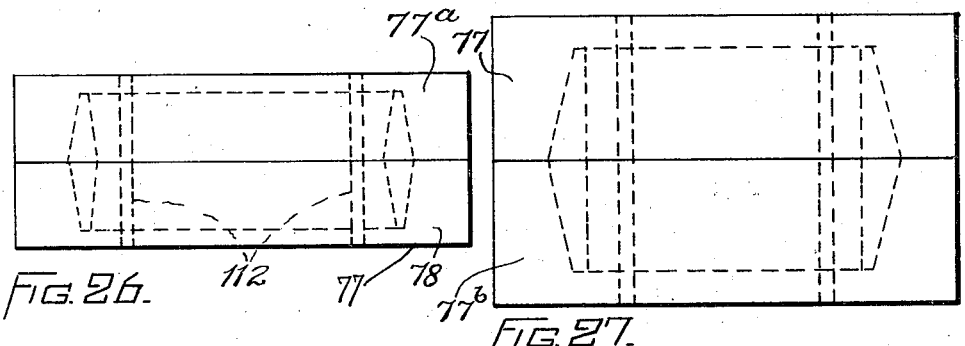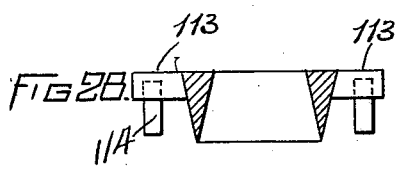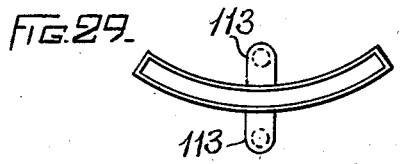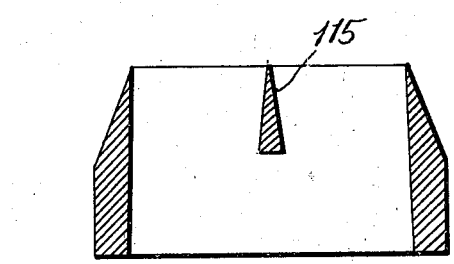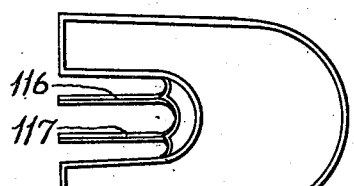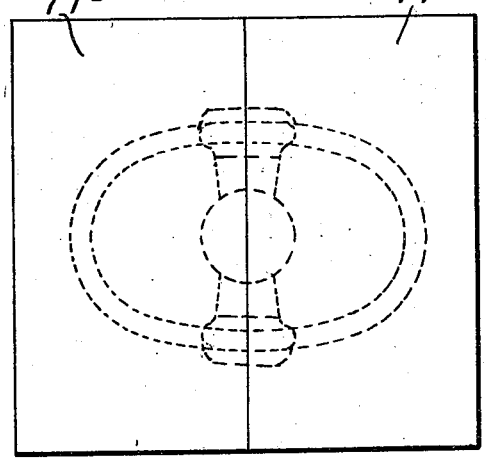

Nov. 1, 1927.
M. V. PRESTON
METHOD OF AND APPARATUS FOR MAKING CUTTING DIES
Original Filed Oct. 11, 1919    9 Sheets-Sheet 7
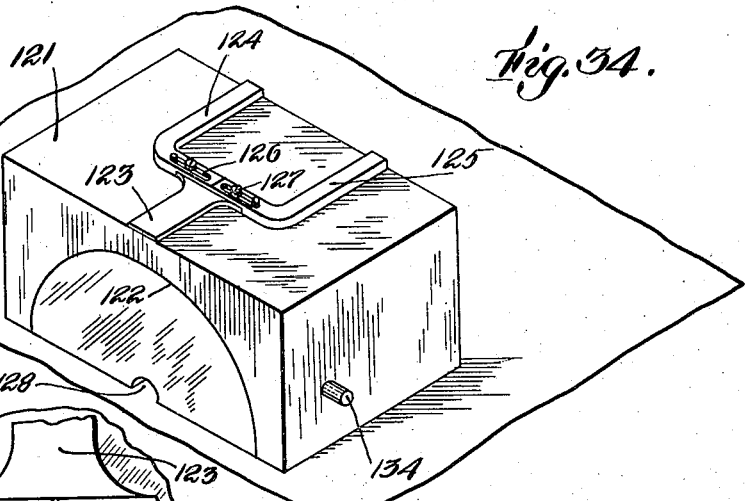
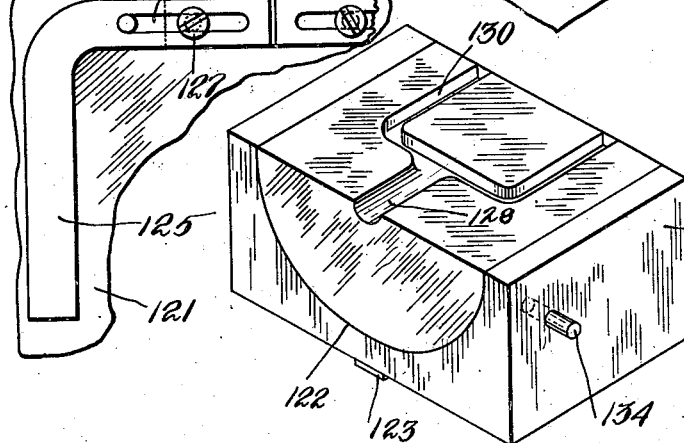
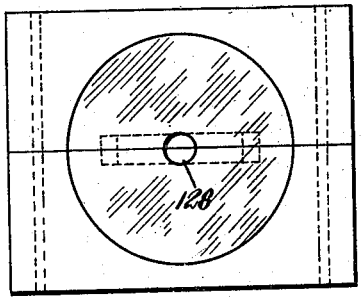
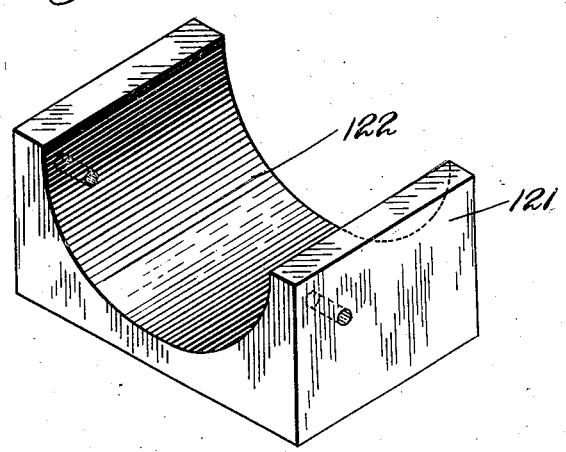
Inventor:
Marshall V. Preston
by Wright, Brown, Quinby & May
Attys.

Nov. 1, 1927.

M. V. PRESTON 1,647,415

METHOD OF AND APPARATUS FOR MAKING CUTTING DIES

Original Filed Oct. 11, 1919   9 Sheets-Sheet 8

Inventor:
Marshall V. Preston
by Wright, Brown, Quinby & Ray
Attys.

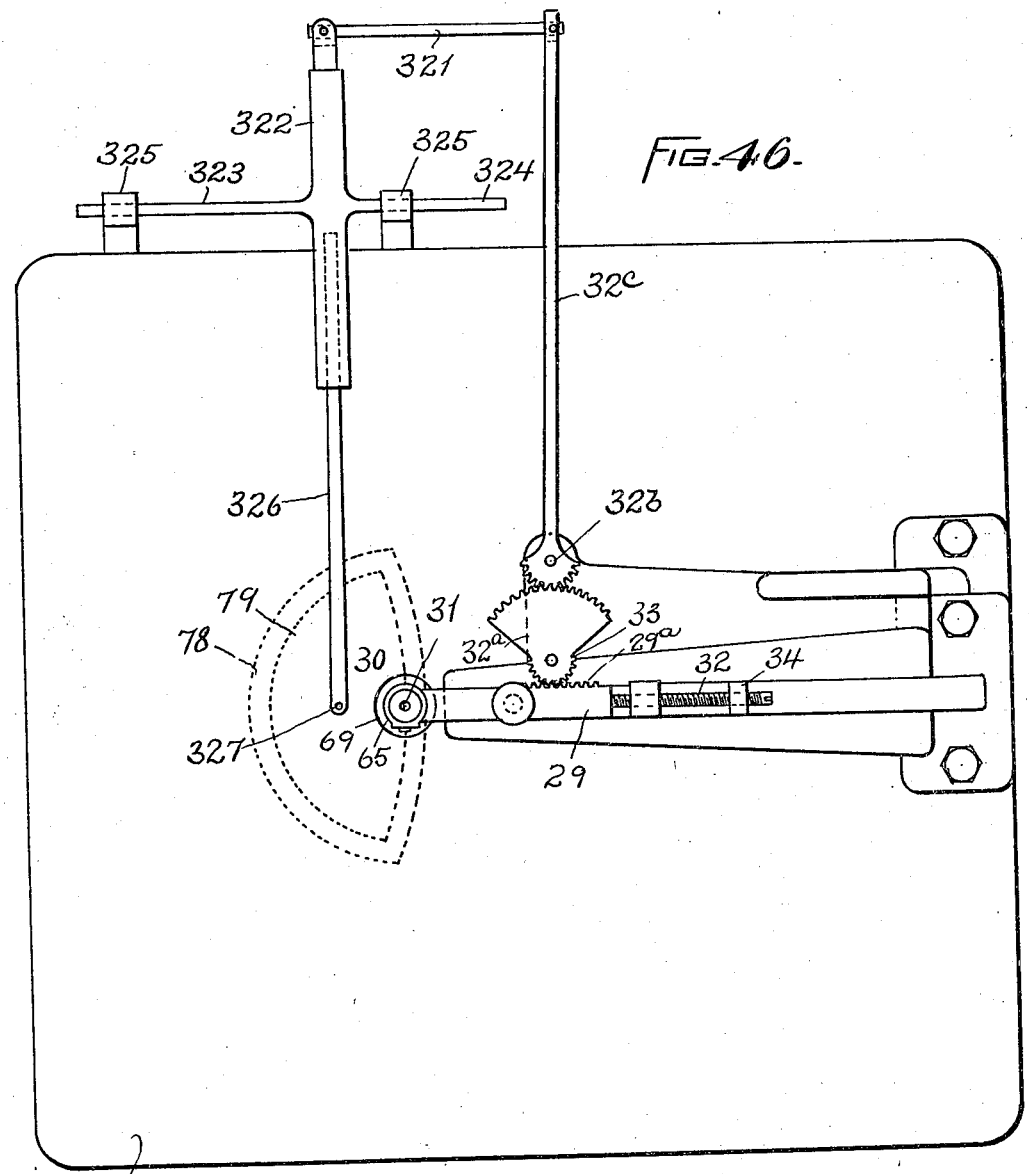

Patented Nov. 1, 1927.

1,647,415

UNITED STATES PATENT OFFICE.

MARSHALL V. PRESTON, OF BOSTON, MASSACHUSETTS.

METHOD OF AND APPARATUS FOR MAKING CUTTING DIES.

Application filed October 11, 1919, Serial No. 330,025. Renewed May 7, 1925.

The present invention relates to the art of cutting sheet material by means of dies which are adapted at one or more strokes to cut a complete article or blank from the material. Dies for this purpose have cutting edges in the outline of the article or blank to be cut, and usually such cutting edges from closed outlines, and such outlines are more or less irregular or symmetrical according to the nature of the blank to be cut. A very large use for dies of this nature is in the manufacture of shoes, the dies being there used for cutting from leather, or cloth, pieces such as vamps, uppers, toe caps, foxings, stays, linings, etc., to be stitched together for making shoe uppers; or soles and heel lifts. Dies of similar nature are also used in other arts to cut out blanks of cloth, rubber, felt, leather, etc., for hats, clothing, gloves, harness, rubber manufactures, and various other purposes. A common characteristic of dies such as those with which this invention is concerned is that such dies have a relatively great total length of cutting edge in proportion to their mass of metal; in other words, that the body or mass of the die exists only at or adjacent to the cutting edge, the interior being open entirely or in large part; and the mass is made as small as possible consistent with the presence of the necessary strength and rigidity.

Inasmuch as dies commonly known as clicking dies, handle dies, and Walker dies, for use in the shoemaking art for cutting parts of shoes from leather, rubber and cloth form a large proportion of the total number of dies of the sort noted, and dies for that particular purpose involve perhaps the greatest variety and intricacy of shape and outline, I will for the purpose of explanation of the invention treat the product made according to my invention as being cutting dies for shoe parts, but without intending to indicate thereby any limitation in the utility of the invention or in the scope in which I claim protection therefor.

Numerous modes of making such dies have been suggested and tested, but the one which has best met the test of commercial practice is that in which angular strips or bars of metal having, after hardening, the capacity for holding a cutting edge are first bent to the required outline, and welded at the meeting points of the ends of said strip, or of a number of strips used in making one die. The stock so used varies in width according to the height required of the finished dies and is most commonly of the following widths, three-quarters of an inch, one inch, an inch and a quarter, two inches and a quarter, and three inches and a half. The fashioning of this stock by bending to form is a difficult and tedious operation requiring the most expert artisans for its performance, since it involves shaping the metal to a templet or model while softened by heat; and the welding is a serious detriment since the interlocking of metallic oxides and the high temperature to which the metal must be brought for welding alters its character to such an extent that the welded joints are weaker than the remaining parts of the die. In the case of elaborate or complicated dies two or more pieces have to be welded together, with a correspondingly large number of welded joints. Thus the commercial method of making dies is slow and expensive and the result leaves much to be desired in the quality and strength of the product.

It has also been suggested to cast the dies in a mold, using metal or wood patterns and making molds according to the usual practice of metal founding; but it has been found that such methods are so difficult and expensive in comparison with the commercial method above described as to be practically prohibitive.

The purpose of my invention is to produce dies in any form and outline desired, having homogeneous character throughout, accurately corresponding to the model or blank for the article to be cut by the finished die; and to do this mainly without skilled labor in a shorter time and a greatly reduced expense as compared with the previous methods. Briefly and comprehensively stated this object is secured by forming directly in a body of material suitable for a mold, a mold cavity having the outline of the die to be made, with or without allowances for shrinkage or other tolerances, guiding the formation of such cavity by the customer's model itself, and casting the die directly in such mold cavity by flowing thereinto metal of the composition required for dies and being in the molten state. Other characteristics of the invention subordinate and ancillary to that just stated appear from the following detailed description and are pointed out in the appended claims, with reference to the drawings furnished herewith showing illustratively the steps of the method and a suitable form of apparatus for making the mold or mold cavity.

Figure 25:
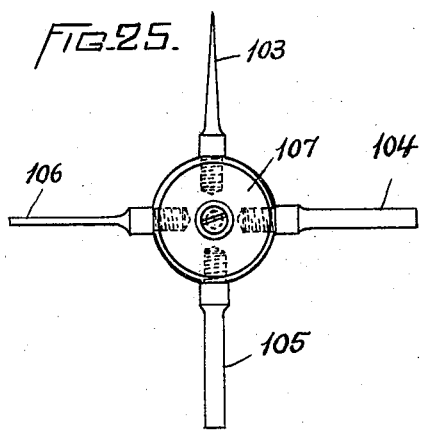
Figure 22:
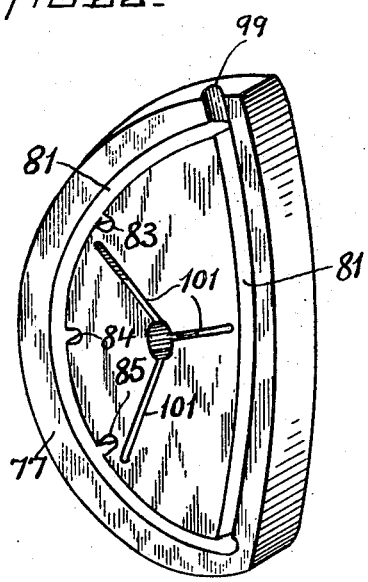

Referring now to the drawings, Figure 1 is a plan view of the mold cutting machine. Figure 2 is a side view of the same with a part broken away and shown in section. Figure 3 is a front elevation of the machine but showing the table in section. Figure 4 is a plan view of the parts below the line 4—4 of Figure 3. Figure 5 is a horizontal section on line 5—5 of Figure 3. Figure 5ª is a perspective view showing in detail the channeling tool or bit of the machine. Figure 6 is a detail view showing a longitudinal section on line 6—6 of Figure 1. Figures 7, 8, 9, and 10 are detail views in elevation and perspective, respectively, of the adjustable cutting-tool holding means. Figures 11 and 12 are top and bottom plan views, respectively, of a mold made and used in accordance with this invention. Figure 13 is a fragmentary view of the mold on a larger scale illustrating a detail thereof. Figure 14 is a sectional view on line 14—14 of Figure 13. Figures 15 and 16 are perspective views as seen from above and below respectively of the die made in the mold last described. Figure 17 is a cross section on line 17—17 of Figure 15. Figure 18 is a section of the same die on a parallel line. Figure 19 is a plan view of a die of different outline made according to my invention. Figure 20 is a detail shown on an enlarged scale of that part of the die at the right of the line 20—20 of Figure 19, a part being shown in section. Figure 21 is a fragment of a model showing the facility with which notches may be produced in the dies. Figure 22 is a perspective view and Figure 23 a sectional view showing the preferred manner of arranging the mold in pouring the casting. Figures 24 and 25 are respectively a side view and a front view of a modified form of gage or guide adapted to be used with the mold cutting machine. Figures 26 and 27 are views of modified forms of mold for casting certain types of die. Figures 28 and 29 are a section and a plan view, respectively, of a so called wing die, which is narrow in width and has supporting wings. Figure 30 is a sectional view of a double die which may be cast by my method. Figure 31 is a plan view of a so-called insertion die in connection with a standard die. Figures 32 and 33 are respectively a vertical section and a plan view of a mold arranged for casting handle dies according to my method. Figures 34 to 45 inclusive are detail views illustrating the mode of applying the principles of the invention for the purpose of making molds, cores, or flask sections for casting a handle integrally with the body of a die. Figure 46 is a plan view of a modification of the mold cutting machine illustrating an automatic means for making allowance for certain tolerances in the mold.

Like reference characters indicate the same parts in all the figures.

I will first describe the particular mold cutting machine here shown and then the complete operation of making the dies, in the course of which this machine may be used; further explaining the principles and essential characteristics of the invention. 26 represents a table supported by legs 27 and on which there is an overhanging goose neck or bracket 28 supporting an adjustable slide 29 having a head 30 in which there is a guide 31. The slide is adjustable lengthwise by means of a screw 32 threaded through a lug 33 on the slide and confined between abutments 34 and 35 on the bracket. A graduated head 36 serves to turn the screw and to indicate with reference to a fixed index 37 the amounts of adjustment.

Beneath the table there is hung a bracket 38 secured by screws 39 and having a flat guiding surface 40 against which abuts a plate 41 which is adapted to slide on the surface 40 and is guided by a vertical tongue 42 on the plate contained in a complemental groove in the face of the bracket. The plate is held against the bracket by a screw 43 which is screwed into the plate and carries a sleeve 44 fitting an upright groove 45 in the bracket and having a flange 46 which overlaps the edges of the groove as shown in Figures 5 and 6. The plate is normally held in elevated position and permitted to be depressed against yielding resistance, by two springs 47 and 48 which are hung from hooks 49 and 50 secured to the under side of the table and are engaged with studs 51 and 52 projecting from the plate. A yoke or fork 53 is secured to the plate and is connected by a link 54 with a treadle 55 pivoted to a bracket 56 on the floor; whereby upon depression of the treadle by the operator's foot the plate may be lowered. As shown in these drawings the machine is designed to be placed upon a table or bench 57 or other support but it may be designed to rest directly on the floor by having legs long enough to bring the table up to a convenient height.

The plate 41 is essentially a slide which may be otherwise formed than as shown and provides part of a tool holder, the other part being a sleeve 58 having wings 59, 59 and a flat surface bearing against the outer surface of the plate or slide and secured thereto by bolts 60, 60 as shown best in Figures 7 to 10. Within the sleeve 58 is fixed a bushing 61 providing a bearing for a shaft 62 which carries on its upper end a routing or channeling tool 63, which for convenience of description I will call a "bit". On the lower end of the shaft which protrudes from the sleeve is secured a driving pulley 64 adapted to be driven by a belt from any convenient source of power.

A collar 65 is secured to the upper protruding end of the shaft 62 and rests on the end of the bushing to support the shaft; and it is provided with a skirt 66 which surrounds the bushing to exclude grit therefrom. It is provided also with an oil hole normally closed by a screw plug 67 and adapted to admit oil for lubrication. Another oil hole 68 is provided in the side of sleeve 58 and through the bushing as shown in Figure 6.

The bit is preferably three sided with tapering equal sides and cutting edges at their meeting angles. In other words the bit is an equilateral triangular pyramid truncated to a greater or less extent, and it projects upwardly through a slot 69 in the table when the tool holder is raised, but is adapted to be withdrawn below the surface of the table for admission or removal of a workpiece. It is thus withdrawn by depression of the treadle or lever 55 and raised by the springs 47, 48, and the distance of its projection when raised is limited by a stop 70 made conveniently as a screw threaded adjustably through a bracket 71 and fixed as to its adjustments by a set screw 72. Bracket 71 is fastened to the sleeve of the tool holder by screws 73 as shown in Figure 6. By the adjustment of this stop screw the bit may be set to cut cavities or grooves of greater or less depth in a mold. The guide or gage 31 is approximately in line with the bit and may be placed exactly in line or at any desired distance out of line by adjusting it as previously described by means of the screw 32. Likewise the gage is adjustable endwise to admit under it mold blocks of greater or less thickness, and for this purpose it is provided with a shank passing through the head 30 and adapted to be moved endwise therein and secured by a set screw 74.

Further adjustment of the bit whereby to place either its axis vertical or the cutting edge at either side vertical or at any desired inclination, within limits, is afforded by making the sleeve of the tool holder adjustable angularly with respect to the slide 41. For this purpose the slide is provided on its outer face with a curved groove 75 and the sleeve and its wings with a complemental tongue or rib 76, both tongue and groove being curved on the arc of a circle of which the center is at the same height as the tip of the bit. That is, the arrangement of the tongue and groove is such that the bit may be changed as to its inclination without altering the location of its tip. It makes no difference what the position of the tool holder may be when this adjustment is made because in the up and down movements of the tool holder all parts move as a unit, and the tongue and groove connection is at the same distance from the tip of the bit in all of these positions. Adjustment is permitted by relaxing the bolts 60 and is secured by tightening up the bolts. The plane in which this angular adjustment is made includes the line in which the gage or guide 31 is horizontally adjustable, whereby such angular adjustment does not result in any displacement of the bit laterally relatively to the guide. Said angular adjustment, it may be observed, is provided for in order that either the outer peripheral surface or the inner surface of the die to be made may be brought perpendicular or at any desired angle to the plane of the cutting edge. Dies used for some purposes, as for cutting a large number of thicknesses of cloth or felt, and for cutting pieces out of sole leather and similar stiff material, are made with the interior surfaces more or less nearly perpendicular to the plane of the cutting edge, and so are the adjacent surfaces of dies having cutting parts close together, while in dies used for other purposes such as cutting upper leather, this arrangement is not necessary. This adjustment enables any desired effect of the sort indicated to be obtained while retaining the effect of providing a sufficient thickness of metal in the back of the die.

In using the machine in the process of making dies, a blank mold block 77 is first provided. Preferably such block is made of sand mixed with a suitable binding agent, compressed, and baked. Any sand suitable for making molds or cores for steel castings may be used. Such sand is readily available, and so are binding agents of various compositions having sufficient adhesive and cohesive properties to make a slab which is firm enough to undergo the channeling process. Such a slab is indicated at 77. It is shown in Figures 1, 6, 11 and 12 as surrounded by a metallic frame or band 78, but such a band is not essential and may be omitted. Indeed the molds shown in other figures are represented as being without any such band. It is to be understood, however, that I do not limit this feature of the invention exclusively to sand as the material for the mold blank, or to the use of any particular binding agent with sand, or otherwise than pointed out in the appended claims. I desire to obtain protection for the method as hereinafter claimed using for the mold any material whatever which is adapted to be worked as a mold substantially in the manner herein described, and to confine, without permitting any substantial change in the cross-sectional dimensions of the mass until it has cooled to hardness, molten steel or other metal or alloy from which operative cutting dies may be made.

On one surface of the mold blank, of whatever material made, is placed a model 79 of the piece to which the die is to be made to conform. This model may be a paper pattern such as is furnished by shoemakers to the die makers, or it may be a metal, fiber, or board templet corresponding to the pattern. All that is required mechanically of this model is that it should be stiff enough and thick enough to serve in connection with the gage 31 as a means for guiding the mold blank past the bit, that is, when the perimeter of the model is used as the guiding means in contact with a gage; for, as will later appear, it is possible under certan conditions to use as the model an outline marked on the surface of a paper sheet and in that case the model need not have stiffness. Models made out of Manilla paper have the necessary qualities in this regard. The model may be secured by tacks as shown at 80 in Figure 11, or by adhesive or otherwise; and mold blanks made of the materials mentioned have sufficient cohesion, denseness and firmness to receive and hold tacks.

The mold blank thus prepared is placed on the table and brought under the gage until the edge of the model brings up against the gage, the latter having been adjusted so as just to clear the top side of the mold and to engage the model, and the bit having been withdrawn. Then the bit, after having been set in rotation, is allowed to rise as far as permitted by adjustment of the stop 70, and in rising it cuts a hole in the mold. Then the mold is moved along the table with the edge of the model in contact with the gage, whereby the bit is caused to cut a channel. At each corner of the model the mold is moved slightly past the corner whereby the molding channel or cavity 81 is formed with short jogs 82 at the corners as shown in Figure 12 for a purpose presently to be axplained. In this manner the mold is moved and suitably turned until the entire periphery of the model has been carried past the gage, whereupon a groove or cavity in a complete outline of the die is made. In thus making the mold cavity allowance for shrinkage of the casting, and other tolerances, are made by setting the gage 31 enough out of alinement with the bit to make the molding channel enough greater than the periphery of the model as may be required in any case. That is, the gage adjustment allows the mold to be graded from the model according to the tolerance required.

The allowance for shrinkage may be made automatically, and in Figure 46 I have illustrated a modification of the machine having means for doing this. Here the micrometer screw adjustment for the gage is omitted and the slide 29 is equipped with rack teeth 29$^a$. A pinion 32$^a$ is mounted upon a part of the head 28 in mesh with said rack teeth and also in mesh with a gear segment 32$^b$ which is pivoted to the head and is connected to a lever arm 32$^c$. The arm is connected by means of a link 321 with a sleeve 322 mounted in a sliding manner upon the machine frame, conveniently by means of rods 323 and 324 which slide in bearings or guides 325 provided on brackets which project from the table 26. With the sleeve 322 is associated a telescoping rod 326 adapted to be engaged with the mold blank, and for so engaging it I may provide its end with a prick point capable of penetrating the mold and of being pushed into it. Thereby when in the course of the rotational movements of the mold the point 327 at which the rod is engaged with it moves toward or away from the bit, the gage is correspondingly moved but in a reduced ratio and by amounts proportional to the movement of the point 327. The ratio is as 1 to 48 when the mold is prepared for casting a steel die, since the shrinkage of steel is one-quarter of an inch to the foot. In order that the length of the arm 32$^c$ and the telescopic members 322, 326 may not be excessive, I may make the gear 32$^a$ as a compound gear, consisting of two segments of different radius, the one of short radius being in mesh with the rack and that of the longer radius in mesh with the segment 32$^b$. For purposes of description the part 322 may be considered as a traveler movable by and with the mold and having such a connection therewith as will permit freedom of movement of the mold. It is not essential that this mode of connection should be by a telescopic rod, but such rod has been illustrated as an operative means. This whole mechanism is a reducing motion mechanism for which various equivalents, all understood by those acquainted with the art of grading and pantographic mechanisms, may be substituted. It is presented here as an illustrative embodiment of operative means for automatically modifying the mold from the model to allow for shrinkage or any other tolerance having a fixed proportional value. Allowance for shrinkage, may also be made by making the model larger than the finished size of the casting to be made, in proportion to the shrinkage of the metal.

Dies frequently have what are called "knives" or "chisels" projecting inwardly from the cutting edges, the purpose of which is to incise or snip the edge of the cut piece to permit folding or to guide the placement of other pieces which are to be assembled with them, or they carry pricking points called "stabs" to prick guide holes in the cut pieces, or their edges are made with offsets suitable to notch or "pink" the edges of the cut pieces for ornamentation or identification, and in the case of the more elaborate forms of dies they may have braces crossing from one part to another. Provision may be made in the mold for casting any of such knives, or tongues for carrying stabs, or braces, by suitable use of the bit in the course of channeling the mold. Figure 12 shows indentations at 83, 84, and 85 to provide so called knives on the die. The location of these indentations is determined by cutting notches at the proper corresponding points in the model as indicated at 86, 87, and 88 in Figure 11, the indentations being made by moving the mold so that the gage or guide 31 enters said notches when the notches arrive opposite to it in the course of the channeling operation. The wavy or zigzag formation to provide the notch cutting offsets in the die may be formed either by giving the model a zigzag outline at the points required, as shown in Figure 21, whereby such outline in being traversed in contact with the gage causes the mold cavity to be cut in zigzag form as shown at 89 in Figure 19, or additional width may be given to the mold cavity whereby space is made for casting a rib or bead on the die, such rib to be afterwards shaped by filing or cuting in any approved way to make the desired zigzag cutting edge. Tongues or stabs, and braces or bridges should lie entirely back from the plane of the cutting edge, and they may be made by cutting away the material at the proper points by a special bit of such length and diameter that the channels cut at these points will have less depth, and usually greater width, than the channels for casting the edge-carrying parts of the die.

The mold shown in Figures 11 to 14 and the die cast therein shown in Figures 15 to 18 is one of the more simple forms and is specifically that of a toe cap for a shoe upper. These figures show the provision of knives in the interior of the die, simply for illustration of the principle. In Figure 15, which shows the casting as it comes from the mold, 91, 92, and 93 are the ribs cast in the grooves 83, 84, 85, respectively; and Figure 16, which shows the finished die, shows also the manner in which these ribs are beveled to form the cutting edges 94 running inward from the cutting edge 95 of the die outline.

Mention has already been made of the fact that when a mold cavity having decided corners is being cut the cutting operation is carried past the corners as indicated in Figure 12. This is done for the purpose of insuring a sharp corner, that is, one having a distinct angle and not rounded at the cutting edge. The casting when removed from the mold provides external ribs 96 at the corners, the outer sides of such a rib extending the outer surface of which it is the continuation across the line of the meeting surface of the die. Such ribs are ground away in the finishing operation, and when entirely ground off they leave distinct and sharp corners. If such extensions were not formed the corners of the casting would be rounded because the bit generates a surface of revolution, and in order in that case to make the desired distinct corner, it would be necessary to grind away a considerable part of the substance of the die, much more than need be ground away for merely finishing it, and inaccuracy would be likely to result.

Figure 23:
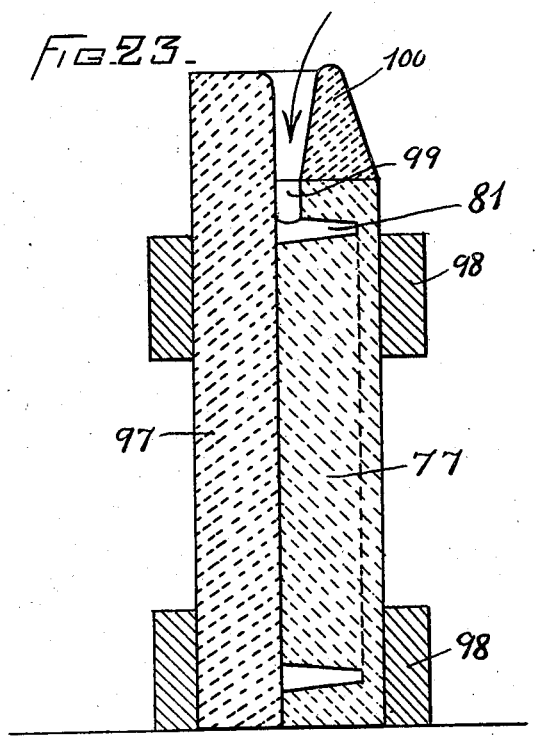
Figure 39:
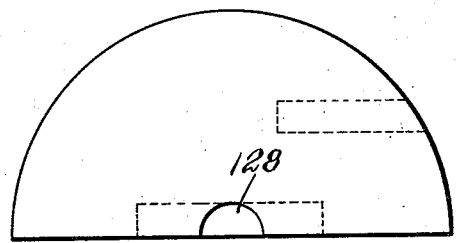
Figure 41:
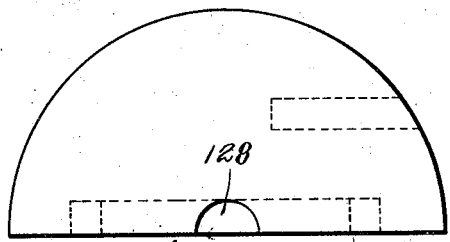
Figure 40:
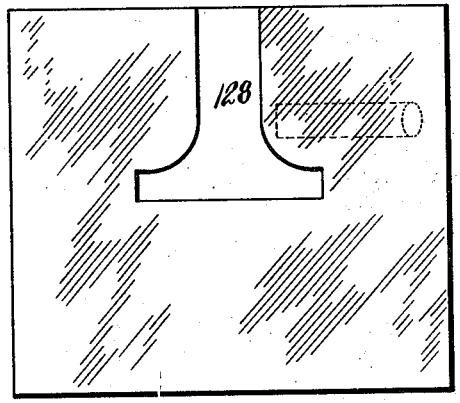
Figure 42:
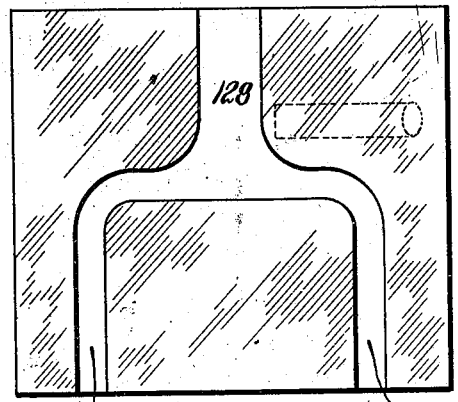
Figure 43:
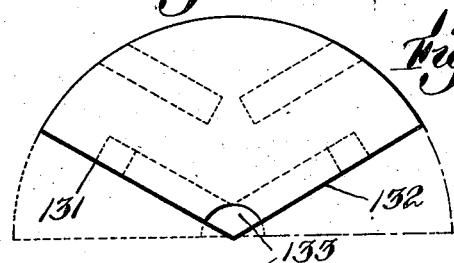
Figure 44:
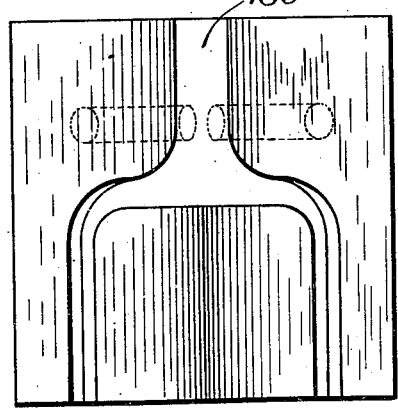
Figure 45:
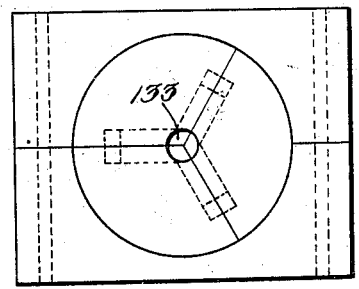

In order to pour the metal the mold is preferably placed in an upright position as shown in Figures 22 and 23, the mold cavity being then covered by a cover plate 97 of sufficiently refractory material, for example, a slab of the same sort as that of the mold, said cover plate being secured to the mold by clamps 98. A sprue passage 99 is cut in from the edge of the mold to the cavity and about the same is placed a dam 100 to provide a sufficiently large pouring opening. Then the metal is poured. In the case of dies of more or less intricate outline, or those having parts which extend laterally far to one side it may be desirable to provide two or more sprue openings, or gates running directly from the sprue opening to remote parts of the mold cavity in order to secure filling of all parts of the cavity with molten metal in a short time and avoid making defective castings by chilling of the metal before penetration to the remoter parts of the cavity. Such gates are made at the time of cutting the mold by appropriate use of the tool or bit, preferably with the bit partly withdrawn or a special bit may be used in order that the metal which hardens in the gate or passage may be of slight thickness and able to be easily broken or cut away. Of course the mold may be poured otherwise, for example, in the horizontal position, with or without a toy flask placed on top of it and with any number of sprue or pouring openings suitable to the work in hand, as is well understood by metal founders.

It will be apparent to those acquainted with the founding art that, as the castings made by this method are composed of a relatively thin band of metal surrounding a part of the mold, there is a possibility of breakage of the metal occurring through shrinkage upon cooling. In order to prevent this effect I cause the integrity of the interior part of the mold to be destroyed before any material shrinkage has taken place. This may be done either by striking the interior part of the mold a sharp blow with a hammer at a time after the metal has solidified but before it has shrunk materially, or it may be automatically accomplished by the shrinkage of the metal itself; and in order to permit such automatic disintegration I make division cuts 101 as shown in Figures 12 and 22 which may pass entirely through the mold slab from one face to the other and extend from inner points to near the molding cavity. Between the ends of these dividing cuts or slots and the mold cavity are left necks 102 of the integral mold substance wide and strong enough to support the side of the cavity at these points when the metal is being poured, but weak enough to be broken down under the much more powerful force applied by the shrinkage of the metal.

These dividing cuts may be made by the bit 63 or by another tool in another machine, and they may be made anywhere in the interior of the mold as required to permit disintegration or collapse of such interior part as the metal shrinks.

Sometimes dies are required to be made with double cutting edges, whereby the same die may be used for cutting right and left hand pieces, or with an especially great height, or dies which are relatively very narrow in proportion to their length may need lateral supports to prevent them from tipping over when in the clicking press; the last indicated type of die being known as a wing die. All of these types of die may be made by my method; the double edged dies and those of extra height being made as indicated respectively by Figures 26 and 27, two molds, 77 and 77$^a$ in the one case, or 77 and 77$^b$ in the other case, being channeled similarly but oppositely, and the molds being then placed face to face with their channels registering. To procure exact registry the complemental molds may be located by pins 112. The mold becomes in effect a two-flask mold and the metal may be poured into it as already described or in any other convenient way. The two molds for the double edged die may be channeled by the same bit; but for the die of extra height that mold which forms the top part of the die is preferably cut by a bit of less taper than the other.

A type of wing die is shown in Figures 28 and 29, and the wings are designated 113. These are outwardly projecting lugs, for making which the mold may be provided with shallow offsets in the way already described for making tongues and braces. After completion of the die studs 114 of rubber or other material are secured to the wings.

Double dies are used for some purposes such as cutting two heel lifts at one stroke. The outline of such a die conforms to the outline of the two lifts or other articles placed end to end or side by side and there is a partition across the middle to divide the cut piece into two articles. In Figure 30 such a die is shown in cross section and the subdividing partition is shown at 115. The die, of course, is made as previously described, preferably in the manner illustrated in Figure 27, and the partition is made by making a cross channel in that part of the mold which provides the cavity for casting the edge of the die. In case the partition is not to be as high as the sides of the die, the mouth or outer part of the cavity in which it is cast may be closed by a block fitted thereto.

Insertion dies are also used to sever into separate strips parts left projecting from the sheet of stock by the cut of the main die. Such insertion dies are frequently used with dies for cutting vamps, and Figure 31 which shows a vamp die with insertions, the parts 116, 117 represent the cutting elements which correspond in that form of die with the commonly used insertion dies. These insertion dies are made by my method by simply cutting additional molding channels or grooves in the mold block in the necessary places. They may also be made separately in a separate mold produced according to my invention.

Handle dies may likewise be made by this method. Such dies have a bridge provided with an upstanding stem or handle adapted to be grasped with the user's hand and also to be struck with a hammer. Heretofore the making of this type of die has been a very difficult matter, but with my invention it may be made with but little more difficulty than dies of simple form. Figures 32 and 33 illustrate the method used in this case. The mold for the die proper is made substantially as hereinbefore described, either in a single flask mold as shown in Figures 12, 22, and 23 or in a two flask mold as shown in Figure 27; and on top of the mold for the die proper are placed molds or cores which are recessed to provide a cavity suitably formed to cast the bridge and handle. Thus in Figure 32 77 is the mold prepared for the extremity of that part of the die which carries the edge; 77$^a$ is the extension mold prepared for making a casting having excess length of wall, while 77$^c$ and 77$^d$ are parts of a core or mold which rest upon the mold section 77$^a$. These core sections are each recessed as shown at 118 in Figure 32, and the recesses are matched together and form a mold for the bridge and handle. Preferably the recesses are enlarged at 119 and 120 at each arm of the bridge in order to give an added thickness of metal at the junction with the die proper, and to compensate for error in case all parts of the mold should not register accurately. I prefer also to cut away the outer wall of the cavity in the mold 77$^a$ adjacent to the outer lugs 120, as indicated at 121, whereby to provide additional strength. The interior lug or boss 119 may be cut off in finishing the die. It is to be understood, of course, that the mold for the die proper instead of being made from two parts 77 and 77$^a$ as shown may be made in one part.

The principles of machining the mold cavity as already explained are also applicable to making the cores or molds or flask sections which give form to the bridge and handle part of the handle die; and this whether the bridge has two, or more than two, arms or branches. In making the simple core parts or flask sections shown in Figure 33, for the case where the bridge arms are in the same plane, each of the parts 77$^c$ and 77$^d$ may be channeled out as to the cavities which form the arms of the bridge, by a bit, substantially the same in its operative principles and functions as the bit 63, but possibly appropriately modified as to its profile, under guidance of a model attached to the opposite face of the block. In this way the bridge part of the die may be given a span or width exactly corresponding with the width of the die. The handle cavity may likewise be channeled or machined in the same way, but preferably I form that part of the cavity by a pattern provided in the core box in which the mold section is made.

It is to be understood that such mold sections are preferably molded in a core box and thereby given the desired dimensions, and that any desired contour of surface may be impressed in the section by making a wall or bottom of the core box as a pattern. Hence, as the handles will be of the same shape and size for a large number of dies, the cavity which receives the handle part of the casting may be thus molded in the mold section, but those cavities which form the bridge arms uniting the hande with the die proper are preferably channeled as described to fit the varying widths of different individual dies.

While the model for the bridge arm cavities may be attached directly to the mold sections as just above described, I prefer in the interest of time saving, to provide a holder 121 of a material which is tough and strong enough to be permanent in comparison with the brittle and relatively fragile sand conglomerate from which the mold sections are made. This holder has a recess 122 in which mold blocks, being originally molded in a core box to fit, are placed. And on the surface of the holder opposite to the side having this cavity there is attached a permanent model or templet having a part 123 corresponding to the handle part of the handle die and having arms 124 and 125 corresponding to the bridge parts of the die. These arms are preferably adjustable, so as to lengthen or widen the span of the bridge part, and to that end are so mounted that they may slide in or out and be fixed in any adjustment. A suitable, though not exclusive, mode of thus mounting them is to provide them with slots 126 and to pass an adjusting screw through such slots into a tapped hole in the holder. One or more additional screws or pins may be provided to guide the arms.

The mold sections, being first molded with a cavity to form the handle, such cavity being shown in Figure 34 as 128, is placed in the holder, and then the parts 124 and 125 of the model are appropriately adjusted, and if necessary the guide or gage 31 of the machine likewise adjusted, to come into operative registry with the end of the cavity 128, and then the holder is moved under guidance of the model, whereby the cutting tool is caused to excavate channels 129 and 130 in the mold. In this way the same equipment is conveniently used to provide complete molds for handle dies of all sizes or widths, without need of a large number of different patterns or core boxes to form those parts of the mold or flask in which the handle and bridge parts of the die are cast. By the same method molds for handle dies having three or more arms running from the handle to the rim of the die may be made, but in that case the blank or block flask section is made of a sector of a cylinder which is one-third, or other fractional part of a complete cylinder, in proportion to the number of arms to be provided for. The circumference of the sector is molded to fit the complementally curved surface of the recess 122, while the other faces 131 and 132 are plane and radial. A cavity 133 is preferably molded while in the core box to provide for the handle, and the arm cavities are separately channeled in the faces 131 and 132. In thus channeling these faces the block is placed so that first one face and then the other is brought against or near to the table of the machine, and first one arm and then the other arm of the model is employed in guiding the movement of the holder to cut these channels. Each of the blocks forming the sections of the same flask are similarly treated; and when assembled, they furnish passages and channels properly placed and proportioned to provide in the casting a handle and the desired number of arms integrally connecting the handle with the rim of the die. Evidently in this way handle dies of ample strength may be quickly and economically made.

Metal of the desired hardness and strength for the cutting edge of the die may be provided and the handle united thereto without weakening or otherwise injuriously affecting the quality of the cutting edge or of the metal backing such edge. If desired metal of different qualities may be furnished in different parts of such die, as for example, a metal having relatively great hardness for the cutting part, and metal of greater toughness and less brittleness for the handle part, whereby to sustain hammer blows without being broken.

Intricate forms of die may be made as readily and accurately by this method as simple ones, and the molds for all sorts may be made by ordinary work people, that is, persons having no specialized skill or training. All that is necessary in cutting the mold is to move the mold block so that all parts of the edges of the model thereon are carried past the gage or guide. Interior outlines as well as exterior outlines of a model may be thus traversed across the gage. The latter may be raised temporarily to clear the model in moving from the outside to the inner part of the model in cases where the exterior and interior outlines are closed. Figures 24 and 25 show a means for substituting different gages for one another according to the character of the work. Here four gages, namely, a needle point 103, a flat blade 104, a beveled blade 105 and a square rod 106 are shown as secured to a turret 107 which is mounted upon the slide 29 by a pivot 108 and is adapted to be turned so that either one of the four gage elements may be brought into position for engaging a model. A lock 109 is provided under control of a retracting lever 110 and a projecting spring 111 for locking the turret in either of its positions. The flat blade gage 104 is adapted to coact with exterior edges of the model, and the bevel edged blade 105 to coact with either exterior or interior edges which are straight, convex, or concave within the limit of convexity of the surfaces of the blade. The square rod and needle point gages are adapted to enter notches and offset parts of the model to locate the cavities for forming knives, stab supports, beads, etc. on the casting, and the needle point is further adapted to follow interior outlines having sharp curves, angles, and so forth in the model. Also the needle point may follow lines drawn or marked on the surface of a sheet of paper or any other marking surface, whereby patterns which are merely drawn on a paper and are not cut out may be used as models for determining the form and location of the mold cavity. Some makes of grading machine used in shoe pattern work outline the resulting pattern by marking it on a paper, and the same sheet may contain a number of different grades of the same pattern, one inside of another. If such a pattern paper is furnished to the maker of dies, the latter may use it in channeling a number of molds without cutting from the paper any of the models so outlined.

The method which I have thus described and which comprises the placing of a model directly on the back of a mold, and channeling out a groove in the mold by guiding the relative motion between the mold and a channeling tool by the cooperation of a gage or guide with the model, and pouring molten metal into the mold cavity thus made, is the form of the invention which I prefer on account of its commercially practical quality. I may, however, form the mold cavity in other ways and by other means than as described; in any case, however, determining the position and outline of the cavity by the guidance of the model. That is, I mean to say that I claim the forming of a channel in a mold prepared and adapted to receive the molten metal of which the commercial die is made, such channel being determined by guidance of a model, as my invention, however the steps of the method thus defined are carried out. From this point of view it is immaterial what the nature of the tool for defining or cutting the channel may be, whether it is mechanically or manually operated, and whether the mold is a hard slab of core sand and integrated with a binding composition, or is of other material having sufficient cohesion, and whether the mold is surrounded by a confining band, or is not so confined, and whatever may be the external outline of the mold.

However, while I do not limit my claim to the method otherwise than as above indicated, I do claim as my invention for which I desire protection, a machine adapted to channel a cavity or groove in a mold and embodying the characteristics hereinafter pointed out in the claims of the machine previously fully described. While still embodying the characteristics referred to, the machine may be varied in details of construction and arrangement, for instance, by substituting a different type of bit for the one having the pyramidal form described, or by reversing the arrangement of the tongue 42 and its groove and of the tongue 76 and groove 75.

The use of my invention eliminates the items of greatest expense of the present commercial methods of making cutting dies, such for instance as the making of a templet for manufacturing and testing the accuracy of the die, the equipment required for making templets and the services of templet makers, the investment involved in maintaining a welding machine, the cost of operating the machine and the services of the workman known as the welder. And it also eliminates the great expense, inconvenience, and delay to the customer due to the breakage of welded dies. Instead there is substituted the quick and inexpensive operation of following a customer's model with a guide point and controlling a cutting tool, which can be mastered by any person of ordinary intelligence with the briefest of training and the well understood processes of pouring molten metal. As compared with ordinary founding methods, my method is simpler and less expensive in that it eliminates the need of making a pattern out of either wood or metal, the services of the pattern maker and his equipment, and the services of the skilled molder. The casting resulting from my method, of course, requires to be finished by grinding and filling or otherwise to bring its edge and back in true parallel planes, smoothen the surfaces and make cutting edges, but so also must the dies as made by the present commercial methods be finished in much the same way. In my method the finishing of the die is no more expensive and difficult than that of the older methods, but is less expensive and more accurate in that I intend to use the sand blast for finishing instead of the expensive and inaccurate polishing method heretofore used, while the making of the die is much less difficult and expensive, and the resulting die is more accurate in its conformity to the required outline and is substantially homogeneous as to its hardness and shock resisting qualities, that is, it has no welded joints of different quality from the balance of the die.

In forming the mold the paper patterns or models furnished by the customers may be used in all cases. Even where the pattern thus furnished is not sufficiently stiff, the making of a proper model requires no more than the reproducing of the customer's model in stiffer paper, and the customer will do this although sheet metal may be used. In this specification the term "model" is intended to include any paper or metal contrivance having the outline according to which the die is to be made, whether it is an original model of paper, leather, fiber, or any other material, or is a reproduction or copy thereof either of the same dimensions or larger or smaller in whole or in part, or with casting shrinkage or other tolerances allowed as mentioned previously.

The term "similar" as here used is intended to include the cases where the mold cavity is identical with the outlines of the model, and where it is proportionally larger or smaller than the model.

What I claim and desire to secure by Letters Patent is:

1. The method of making cutting dies which consists in cutting a mold cavity, similar to the outline of a model, in the face of a body of material which has sufficient cohesion to preserve the walls of such cavity, when such walls are approximately square with the face of the body, and is sufficiently refractory to the heat of molten metal suitable for making cutting dies to retain in said cavity a mass of such molten metal without permitting any substantial change in the cross-sectional dimensions of the mass until it has cooled to hardness, and pouring into such cavity molten metal which in the solid state and at ordinary temperatures is strong and hard enough to serve as an edged cutting die.

2. The method of making cutting dies which consists in cutting a mold cavity, similar to the outline of a model, in the face of a body of material which has sufficient cohesion to preserve the walls of such cavity, when such walls are approximately square with the face of the body, and is sufficiently refractory to the heat of molten steel to retain in said cavity a mass of such molten steel without permitting any substantial change in the cross-sectional dimensions of the mass until it has cooled to hardness, and pouring molten steel into said cavity.

3. The method of making cutting dies by casting which consists in forming, in the face of a cohesive conglomerate body of sand and a binder, a groove or cavity similar to a model, using the outline of the model as the guide for making said groove, and pouring the metal of which the die is to be made, in the molten state, into such groove.

4. The method of casting cutting dies which consists in providing a mold body consisting of mixed sand and a binder having cohesion, laying a model on a face of said mold, and producing relative movement between said mold and a channel-forming tool projecting into the mold, in a path such that such tool forms a groove similar to the outline of the model, guiding such relative motion by the edge of the model, and subsequently pouring the molten die metal into the groove so formed.

5. The method of making cutting dies which consists in grooving a mass of cohesive mold material in a line similar to the outlines of a model and under guidance of such model, and pouring metal of a composition adapted to make a cutting die into the groove so formed.

6. The method of making cutting dies which consists in grooving a mass of mold material which is refractory and cohesive enough to maintain the form and dimensions of the groove so formed when subjected to the heat of molten metal suitable for making cutting dies in a line similar to the outlines of a model and under guidance of such model, securing a cover over the groove so formed, forming a sprue opening from such groove laterally to one of the bounding edges of the mold, setting the mold on edge with the sprue opening uppermost, and pouring metal of a composition adapted to serve as a cutting die into the mold thus prepared.

7. The method of forming a cutting die having an outlining cutting edge and a penetrating element offset from said edge, which consists in providing a block of mold material, progressively excavating a groove therein having an outline corresponding to the required outlining edge of the die to be made, excavating laterally from said groove an offset in a position corresponding to the required position of said offset penetrating element, and pouring into the groove and its offset so made, molten metal of the composition needed to make a die.

8. The method of producing a mold for a cast metal cutting die which consists in providing a block of mold material, attaching to one face of said block a model having the outline of the die to be made, bringing the edge of said model into contact with a stationary gaging member, entering from the opposite side of the block a rotary cutting tool, and then moving said mold block so as to traverse the edges of the model past said gage, the tool being maintained in the same location, whereby said traversing motion causes a groove similar to the outlines of the model to be cut in the mold.

9. The method of making a mold for casting a cutting die which consists in providing a guide and a rotating cutting tool opposite to one another and maintained in substantially the same relation to one another, providing a block of mold material, attaching to one face of said block a model having outlines corresponding to the die to be made, placing said block, guide, and tool in relation wherein the edge of said model engages the guide and the tool projects into the block, and then effecting relative movements of displacement between said block on the one hand and the guide and tool on the other hand in a manner such as to cause a traverse of the guide along the edges of the model and the cutting by the tool of a groove in the block similar to the outlines of the model.

10. The method of preparing a mold for casting a cutting die which consists in providing a block of molding material, attaching to a face of said block a model having an outline corresponding to that of the die to be made, entering a rotatable cutting tool into said block from one face thereof, and producing relative translative movements between the block and tool, guiding such movements by the edges of the model, whereby the tool is enabled to cut a groove similar to the outlines of the model.

11. The method of making outline cutting dies which consists in providing a block made of sand and a binding agent having cohesion, cutting in said block a groove similar to the outline required for the die, and pouring molten metal suitable for a cutting die into said groove.

12. The method of making outline cutting dies which consists in providing a block made of sand and a binding agent having cohesion, cutting in said block a groove similar to the outline required for the die, and pouring molten steel into said groove.

13. The method of making, by a casting operation, outline cutting dies which consists in providing a block of sand mingled with a binding agent, attaching to the surface of said block a model of the workpieces which the die is designed to cut, entering a rotating bit into the mold, and effecting relative motion between the mold and bit under guidance of the said model to cause excavation by the bit of a groove in the mold having an outline similar to that of the model with allowance for shrinkage of the casting, and then pouring molten die metal into the groove so formed.

14. The method of making a mold for casting a cutting die which consists in providing a block of mold material, securing a model to the face of said block, placing the block on a table with that side uppermost to which the model is secured, entering a rotatable bit into the block from the under side thereof, locating over the block a gage or guide in the same plane with the model, and moving the block to traverse the edges of the model past said gage in contact therewith, whereby to cause excavation by the bit of a groove in a mold similar to the outlines of the model.

15. The method of making a mold for casting a cutting die which consists in providing a block of die material, securing a model to the face of said block, placing the block on a table with that side uppermost to which the model is secured, entering a rotatable bit into the block from the under side thereof, locating over the block a gage or guide in the same plane with the model, and moving the block to traverse the edges of the model past said edge in contact therewith, whereby to cause excavation by the bit of a groove in a mold similar to the outlines of the model, and allowing for shrinkage of the casting by offsetting the gage from the bit toward the approximate center of the model, whereby the outline of the groove thus made is greater than that of the model.

16. The method of making a mold for casting a cutting die which consists in providing a block of die material, securing a model to one face of said block, entering a rotatable cutting bit into the opposite face of the block, arranging the gage in approximate alinement with the bit, so moving the mold block relatively to the bit and gage as to traverse the outline of the model past the gage, and automatically causing shifting of the gage to a greater or less distance from the line of the bit according as a selected point on the mold is more or less distant therefrom and in proportion to the distance of said point from said line, whereby to make allowance for shrinkage of the casting.

17. The method of making double edged cutting dies which consists in providing separate blocks of mold material which is refractory to the heat of molten metal of the composition suitable for operative cutting dies, cutting in said blocks from one face of each, grooves of similar but reversed outline with respect to one another, said grooves being of diminishing width from top to bottom, placing said mold blocks face to face with their grooves in registry, and pouring molten die metal into the cavity formed by said registering grooves.

18. The method of making a cast metal cutting die which consists in progressively cutting a groove in a mold block having the outline of the die to be made and being open at one face of said block, guiding a tool for making such groove by the outline of a model, cutting in the same way in the face of a second block a groove having the reversed outline of the first-named groove, placing said blocks face to face with their respective grooves in registry, and pouring molten metal suitable for making the die into the cavity provided by said mating grooves.

19. The method of making a die having a handle and conforming to a model which consists in first excavating a groove in a block of mold material in the outline of the model, locating the successive points of said groove by guidance of the outline of the model, placing upon the mold so made a mold or core having a cavity which is the counterpart of the bridge and handle of a handle die, locating the extremities of that part of such cavity which forms the bridge in registry with selected points in the groove of the first mold, and pouring metal to fill said groove and cavity.

20. The method of making a die, which consists in first providing a mold having a groove in the form of the die to be made, pouring molten metal of a quality suitable for the cutting edge of a die into the bottom of said mold groove, and filling the balance of the groove and cavity with molten metal which is in part of a different quality.

21. The method of making a mold for casting a handle die which consists in first providing a block of mold material, channeling in the face of said block, a groove conforming to the outline of a model, using such model outline as a guide in determining the shape of said groove, and placing on the mold thus grooved complemental mold members having mating recesses which together form a cavity for the bridge and handle parts of a handle die, so placing said mold parts that the ends of the bridge-forming cavity register with selected parts of the groove, and pouring molten metal into said groove and cavity.

22. The method of making a mold for casting a handle die which consists in first providing a block of mold material, channeling in the face of said block, a groove conforming to the outline of a model, using such model outline as a guide in determining the shape of said groove, and placing on the mold thus grooved complemental mold members having mating recesses which together form a cavity for the bridge and handle parts of a handle die, so placing said mold parts that the ends of the bridge-forming cavity register with selected parts of the groove, and pouring molten metal into said groove and cavity, the metal first poured, which occupies the bottom of the aforesaid groove and provides the cutting edge of the casting, being of a suitable composition for a cutting die edge.

23. The method of molding a double die which consists in cutting in one face of a block of mold material a groove having the external outline of two selected dies placed in contact, cutting a channel across from one side of said groove to the other, using the lines of a model in determining the location and shape of said grooves, and pouring molten metal suitable for a cutting die into said grooves.

24. The method of producing a mold for a metal casting, which consists in providing a block of said and an agglomerated cohesive binder, entering a rotatable cutting tool into said block from one face thereof and effecting relative traverse between said block and said tool in a path to cause progressive excavation of a mold cavity having a prescribed outline, at the same time so holding the tool that a wall of such cavity thereby defined is steeper with respect to said face than the inclination required for drawing a pattern from a sand mold.

25. The method of producing a mold for a metal casting, which consists in providing a block of sand and an agglomerated cohesive binder, entering a rotatable cutting tool into said block from one face thereof and effecting relative traverse between said block and said tool in a path to cause progressive excavation of a mold cavity having a closed outline, at the same time so inclining the tool that the inner walls of such cavity converge from the face into which the tool enters toward the interior limit of the cavity.

26. The method of making a mold for a cast cutting die which consists in channeling a mold cavity in a block of mold material by causing relative movement to take place between such block and a cutting tool penetrating the block; and providing material for sharp corners in the die by extending one of two intersecting channels thus formed past the point of intersection in course of cutting the channel.

27. In the method of making a mold for a cutting die by channeling a groove in a block of mold material with a rotating cutting tool, that mode of providing excess metal at corners of the casting to be produced which consists in extending a groove being cut beyond the point of intersection with another groove in the course of so cutting it.

28. The method of making a cast metal cutting die having distinct corners, which consists in channeling with a rotating bit mold grooves in a block of mold material, where such grooves intersect at distinct angles extending one of them beyond the point of intersection, pouring molten metal suitable for a cutting die in the mold so formed, the extension groove causing excess metal to be added to the casting at such angle, and then in the subsequent finishing of the casting, cutting away such excess metal in a manner to leave a distinct sharp angle.

29. The method of making outline cutting dies which consists in providing a block of molding material having sufficient rigidity to support molten metal and being sufficiently refractory to confine molten metal, in the spaces prepared for reception of such metal, forming in such block a mold groove corresponding to the outline of the die to be made, and pouring molten steel into said groove.

30. The method of making outline cutting dies which consists in providing a block of molding material having sufficient rigidity to support molten metal and being sufficiently refractory to confine molten metal, in the spaces prepared for reception of such metal, forming in such block a mold groove corresponding to the outline of the die to be made, cutting dividing slots through and across the area of the block within such groove but separated therefrom by intervening walls of sufficient thickness to support the molten metal in the groove but adapted to be broken down by a shrinkage of the casting, and then pouring molten metal suitable for such a die into said groove.

31. The method of making steel cutting dies which consists in channeling in a mold of suitable material a mold cavity in the outline of the die to be made, pouring molten steel into said cavity, annealing the casting resulting therefrom, then heating said annealed casting to the highest transforming point of the steel, quenching it, and finally reheating the casting to a temperature in the neighborhood of 1000° Fahrenheit and allowing it to cool in the open air.

32. The method of making steel cutting dies which consists in forming a channel in a mold of suitable material, which channel follows the outline of the die to be made, pouring molten mild steel having a carbon content of from approximately .60% to .90% in a mold, annealing the casting so produced, heating the casting to a temperature in the neighborhood of 1500° Fahrenheit, quenching the casting in oil, reheating the casting to approximately 1000° Fahrenheit and allowing it to cool in the open air, and finally trimming the casting and forming it with a sharp edge.

33. The method of making outline dies which consists in progressively forming a channel, having the outline of the die to be made, in the face of a cohesive body of sand and a binder, and pouring molten steel into said groove.

34. A method of making cast metal articles which consists in providing a mold block made of sand and a binding agent having cohesion, forming by a progressive cutting or routing action a cavity of the desired outline in one face of said block, and pouring molten metal suitable for the article to be made into said cavity.

In testimony whereof I have affixed my signature.

MARSHALL V. PRESTON.